UNITED STATES PATENT OFFICE.

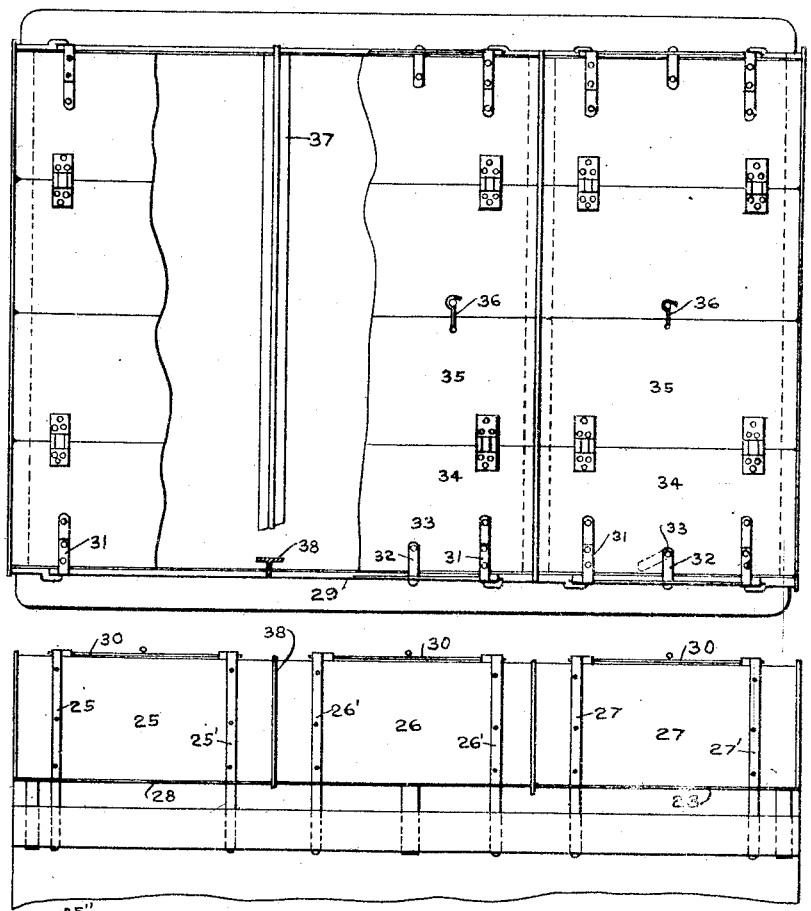

HENRY R. READ, OF BROOKLYN, NEW YORK.

VEHICLE.

1,365,008.     Specification of Letters Patent.     Patented Jan. 11, 1921.

Application filed January 13, 1916, Serial No. 71,909. Renewed June 8, 1920. Serial No. 387,511.

*To all whom it may concern:*

Be it known that I, HENRY R. READ, a citizen of the United States, residing at the borough of Brooklyn, in the county of Kings and State of New York, have invented certain new and useful Improvements in Vehicles, of which the following is a specification, reference being had therein to the accompanying drawing.

My invention relates to improvements in vehicles and has particular reference to vehicles provided with inclosed body portions. The invention is especially adapted for use in connection with wagons or carts used for the carting of ashes, garbage and other refuse, the dirt and odor from which is objectionable and injurious. According to my invention the body portion of the vehicle is adapted to be opened at different parts as required so that only a small portion of the contents of the cart need be exposed at one time, and because of the detachability and removability of the sections, the cart may be used inclosed or opened for various purposes other than those specified.

In the accompanying drawings, I have illustrated in Figure 1 in plan view partly broken away an application of my invention as applied to the body of a cart adapted for the removal of garbage or ashes. Fig. 2 is a side elevation of the same. Fig. 3 is an enlarged detail partly in cross section and partly broken away illustrating one of the methods of holding the detachable parts in position. Fig. 4 is a similar view showing the lower part of the vehicle, and Fig. 5 is an enlarged perspective view partly broken away illustrating one of the cross braces or supports for the covers.

25—26—27 indicate sides of the body portion having stays or supports such as 25'—26'—27' which are adapted to pass through the projecting portion 28 as shown to better advantage in Fig. 4 and through or behind a suitable block, projection, cleat, bracket or other fixture on the side of the vehicle such as 29. The upper ends of the stays or supports may terminate in hooks adapted to hold the top covers of the vehicle such as 34.

37 are suitable transverse bars preferably T-shaped in cross-section adapted to rest upon the tops of the T-bars 38 forming substantially U-shaped side supports of the cover. This is shown to better advantage in Fig. 5 in which it will be observed that the ends of the transverse bars 37 are turned over as indicated at 39 to engage the T-bar 38, and the web of the transverse bar is allowed to project as indicated at 40 to rest upon the top of the projecting portion or web of the T-bar as shown, thus forming a secure and interlocking coupling giving all the necessary rigidity and strength.

In using the vehicle, it will be readily understood that any portion or section of the top may be opened independently of any other portion or section, and the entire top may be completely removed or the entire top and sides may be removed as may be found desirable according to the special requirements of the case. For instance, the sections 34 or 35, or both, may be thrown back to gain access to the central portion of the front or back part of the vehicle or the center thereof and may be closed and suitably secured, and by withdrawing the stay bar or support 25' as aforesaid the sections such as 34—35—36 may be removed from any portion of the vehicle. It will also be understood that by releasing the catch 32 pivoted at 33, the covers 34 may be thrown up at the sides for access to the side of the vehicle, but when locked the catch 32 provides a hinge at the side of the vehicle. This is particularly advantageous for use in combination with carts intended for carrying garbage, ashes and other refuse which it is desired to keep from blowing about the streets and houses. In the use of the vehicle the refuse may be dumped in each section independently and as each section is filled the same may be closed and secured and the others filled successively until the cart is fully loaded after which the same may be dumped as provided for, or the entire superstructure or sectional covers may be removed and the vehicle used for other purposes.

Of course it will be readily understood that various modifications may be made without departing from the spirit of the invention as claimed.

I claim:

1. In a vehicle body, removable sectional sides, hinged sectional top covers, and U-shaped T-irons extending transversely across said body with the transverse flanges thereof inwardly serving as a seating for said sections.

2. In a vehicle body, removable sectional sides, hinged sectional top covers, and U-shaped T-irons extending transversely across said body with the transverse flanges thereof inwardly serving as a seating for said sections said side sections having vertical straps serving as parts of the hinges for said top sections.

3. In a vehicle body, removable sectional sides, hinged sectional top covers, and U-shaped T-irons extending transversely across said body with the transverse flanges thereof inwardly serving as a seating for said sections said side sections having vertical straps serving as parts of the hinges for said top sections and a side shelf upon said body upon which said side sections are secured.

4. In a vehicle body, removable sectional sides, hinged sectional top covers, and U-shaped T-irons extending transversely across said body with the transverse flanges thereof inwardly serving as a seating for said sections said side sections having vertical straps serving as parts of the hinges for said top sections and means for locking said hinges into engaged position.

In testimony whereof I hereunto affix my signature in the presence of two witnesses.

HENRY R. READ.

Witnesses:
  LOUISE ENDERLE,
  THOMAS W. HILL.